(12) United States Patent
Ardison et al.

(10) Patent No.: US 8,733,073 B2
(45) Date of Patent: May 27, 2014

(54) SYSTEM AND APPARATUS FOR CUTTING, WINDROWING, AND BALING MATERIAL IN A SINGLE PASS

(71) Applicant: Pioneer Hi-Bred International, Inc., Johnston, IA (US)

(72) Inventors: Paul L. Ardison, St. Peter, MN (US); Roger J. Scheurer, Kasota, MN (US); Loren Steenhoek, Ankeny, IA (US); Vincent J. Tomlonovic, Mankato, MN (US)

(73) Assignees: E I du Pont de Nemours and Company, Wilmington, DE (US); Hiniker Company, Mankato, MN (US)

( * ) Notice: Subject to any disclaimer, the term of this patent is extended or adjusted under 35 U.S.C. 154(b) by 0 days.

(21) Appl. No.: 13/624,188

(22) Filed: Sep. 21, 2012

(65) Prior Publication Data
US 2013/0074465 A1    Mar. 28, 2013

Related U.S. Application Data

(60) Provisional application No. 61/537,680, filed on Sep. 22, 2011.

(51) Int. Cl.
*A01D 39/00* (2006.01)
*A01D 43/02* (2006.01)
*A01D 75/00* (2006.01)

(52) U.S. Cl.
USPC .......................................... 56/341; 280/412

(58) Field of Classification Search
USPC ............ 56/341, 14.6, 14.9, 15.5, 14.4; 100/8, 100/73, 2; 428/156; 460/114; 172/248, 311; 280/412, 473, 411.1
See application file for complete search history.

(56) References Cited

U.S. PATENT DOCUMENTS

| 2,179,937 | A | * | 11/1939 | Lamp | 100/45 |
| 2,497,641 | A | * | 2/1950 | Wilhelm | 100/6 |
| 2,729,047 | A | * | 1/1956 | Cheatum | 56/344 |
| 2,923,230 | A | * | 2/1960 | Bornzin | 100/98 R |
| 3,006,207 | A | * | 10/1961 | Russell | 474/21 |
| 3,295,299 | A | * | 1/1967 | Brady et al. | 56/12.7 |
| 3,716,972 | A | * | 2/1973 | Case et al. | 56/1 |
| 3,770,064 | A | * | 11/1973 | Scarnato et al. | 171/58 |
| 3,832,837 | A | * | 9/1974 | Burkhart et al. | 56/218 |
| 3,868,811 | A | * | 3/1975 | Cicci et al. | 56/1 |

(Continued)

FOREIGN PATENT DOCUMENTS

| WO | WO-2007/136410 | 11/2007 |
| WO | WO-2011/012948 | 2/2011 |

(Continued)

OTHER PUBLICATIONS

Hiniker; Agriculture Equipment; "5600 Series Flail Windrowers;" date accessed Aug. 17, 2012; dated 2012; http:www.hiniker.com/ag_products%20new/5600flailwindrower.html.

*Primary Examiner* — Árpád Fábián-Kovács

(57) ABSTRACT

A system for cutting, windrowing, and baling material in a single pass. The system has a tractor, a windrower for windrowing material, a baler for baling material that passes through the windrower, a conveying assembly attached to an outlet opening of the windrower, and a connecting assembly for connecting the tractor, the windrower, and the baler. The conveying assembly moves material from the outlet opening of the windrower toward an inlet of the baler.

38 Claims, 14 Drawing Sheets

(56) References Cited

U.S. PATENT DOCUMENTS

| | | | |
|---|---|---|---|
| 4,178,010 A * | 12/1979 | Gerber | 280/412 |
| 4,445,706 A * | 5/1984 | Jarosek | 172/310 |
| 4,558,560 A * | 12/1985 | Koch | 56/228 |
| 4,912,914 A * | 4/1990 | Wingard | 56/16.4 B |
| 4,979,359 A * | 12/1990 | Inskeep | 56/14.9 |
| 5,025,616 A * | 6/1991 | Moss | 56/14.9 |
| 5,146,737 A * | 9/1992 | Gantzer | 56/14.9 |
| 5,255,501 A * | 10/1993 | McWilliams | 56/341 |
| 5,901,541 A | 5/1999 | Lindquist | |
| 5,941,768 A * | 8/1999 | Flamme | 460/114 |
| 6,546,705 B2 * | 4/2003 | Scarlett et al. | 56/10.2 R |
| 6,711,884 B1 * | 3/2004 | McLeod et al. | 56/14.9 |
| 7,003,933 B2 * | 2/2006 | Fukumori et al. | 53/504 |
| 7,509,785 B2 * | 3/2009 | Fukumori et al. | 53/211 |
| 7,628,004 B2 * | 12/2009 | Geiser | 56/192 |
| 7,721,516 B2 * | 5/2010 | Wendling | 56/10.2 A |
| 7,818,954 B2 * | 10/2010 | Rempe et al. | 56/341 |
| 7,877,970 B1 | 2/2011 | Crosby | |
| 8,393,137 B1 | 3/2013 | Crosby | |
| 2001/0013214 A1 * | 8/2001 | Viaud | 53/116 |
| 2003/0093979 A1 * | 5/2003 | Fukumori et al. | 53/587 |
| 2007/0044447 A1 * | 3/2007 | Viaud | 56/15.7 |
| 2007/0191081 A1 * | 8/2007 | Shields | 460/114 |
| 2008/0141639 A1 * | 6/2008 | Shields | 56/14.6 |
| 2010/0326037 A1 * | 12/2010 | Dillon | 56/341 |
| 2010/0326292 A1 * | 12/2010 | Dillon | 100/2 |
| 2010/0330337 A1 * | 12/2010 | Dillon | 428/156 |
| 2011/0023435 A1 | 2/2011 | Matousek et al. | |
| 2011/0023436 A1 | 2/2011 | Matousek et al. | |
| 2011/0023437 A1 | 2/2011 | Kendrick et al. | |
| 2011/0023438 A1 | 2/2011 | Matousek et al. | |
| 2011/0023439 A1 | 2/2011 | Kendrick et al. | |
| 2011/0023440 A1 | 2/2011 | Matousek et al. | |
| 2011/0024538 A1 | 2/2011 | Matousek et al. | |
| 2011/0029909 A1 | 2/2011 | Matousek et al. | |
| 2012/0023884 A1 | 2/2012 | Spikes et al. | |

FOREIGN PATENT DOCUMENTS

| | | |
|---|---|---|
| WO | WO-2011/012949 | 2/2011 |
| WO | WO-2011/012950 | 2/2011 |
| WO | WO-2011/012951 | 2/2011 |
| WO | WO-2011/012952 | 2/2011 |

* cited by examiner

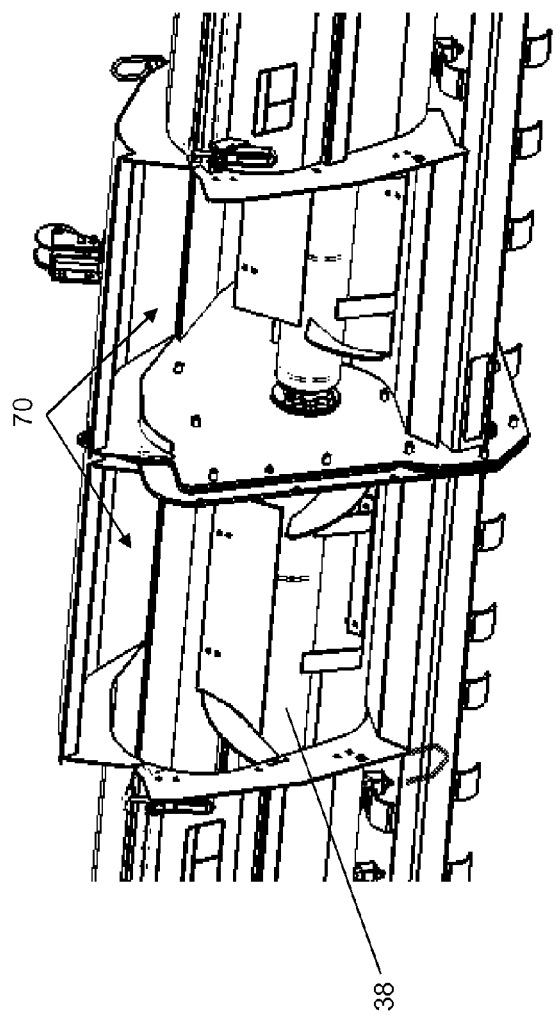
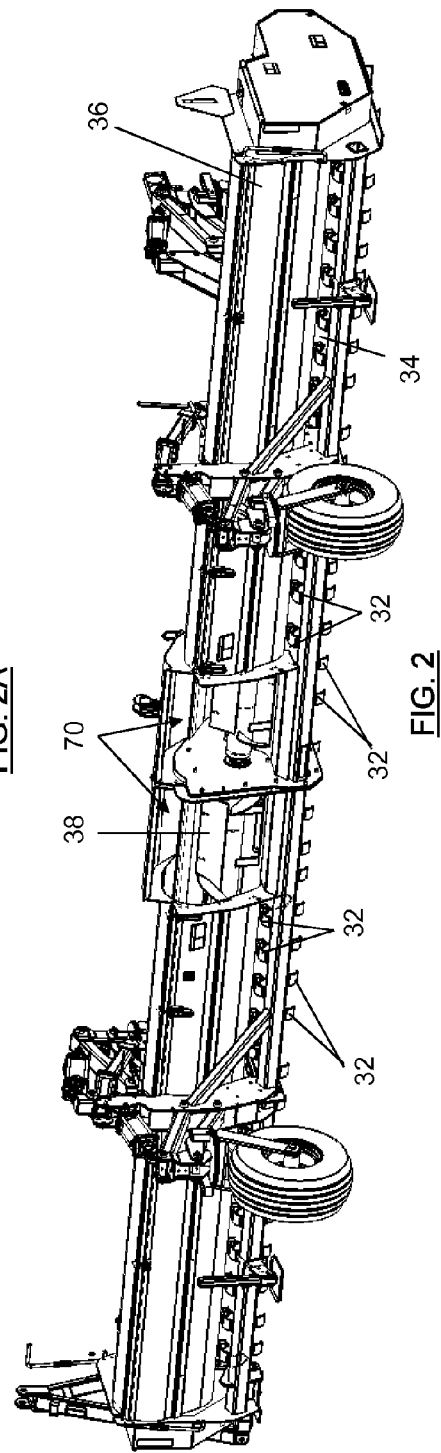

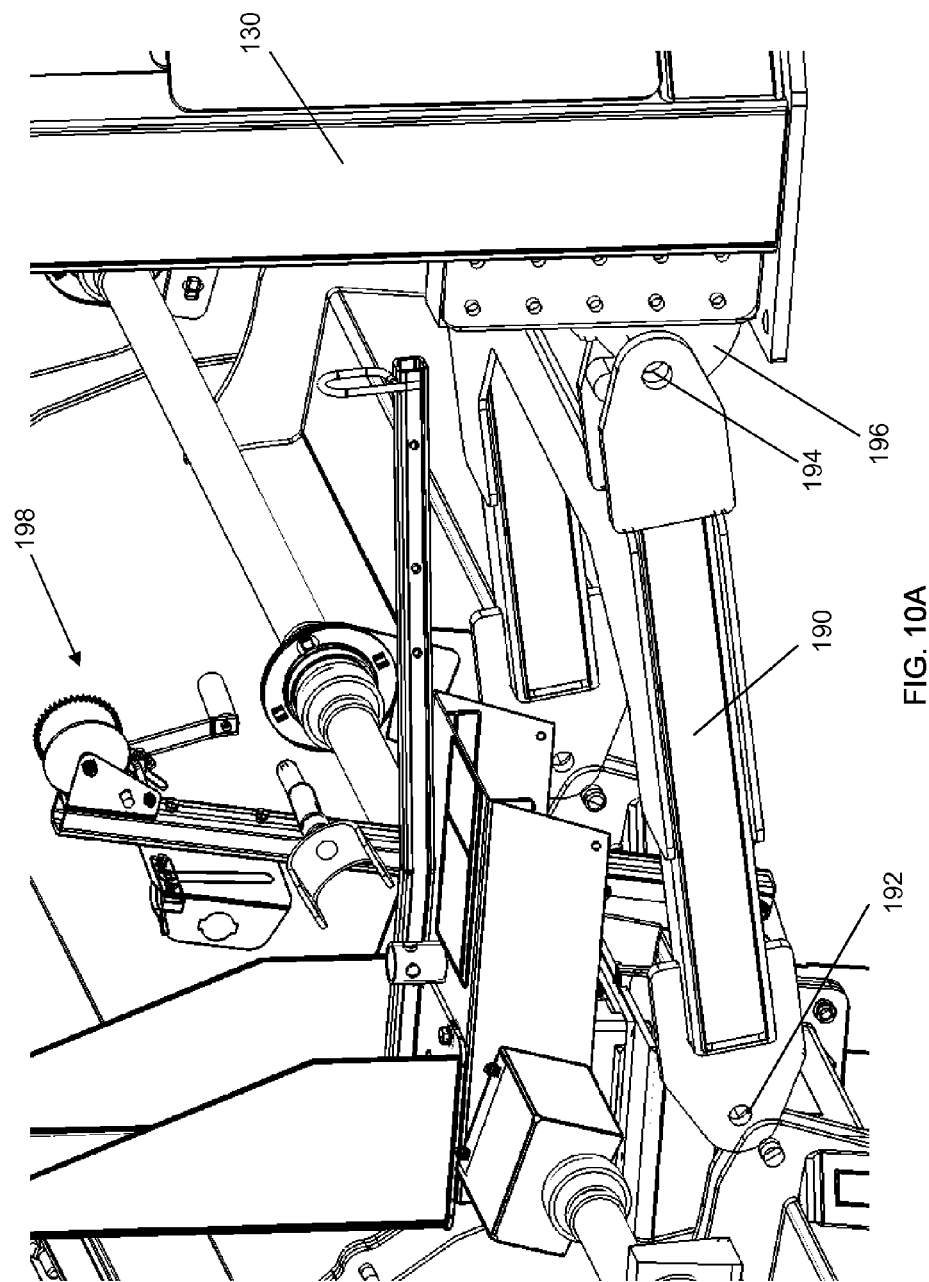

SYSTEM AND APPARATUS FOR CUTTING, WINDROWING, AND BALING MATERIAL IN A SINGLE PASS

CROSS REFERENCE TO RELATED APPLICATIONS

The present application claims priority from U.S. Provisional Application No. 61/537,680, filed Sep. 22, 2011, which is hereby incorporated herein in its entirety by reference.

FIELD OF THE INVENTION

The present invention relates generally to a system, apparatus, and method for cutting, windrowing, and baling material in a single pass. More specifically, the present invention provides an assembly that connects a windrower and a baler in series and a mechanism for conveying material, such as crop material and/or material-other-than-grain, from the windrower to the baler directly, without discharging the material onto the ground after it has passed through the windrower.

BACKGROUND

When harvesting grain, a combine harvester (also known simply as a "combine") may be used to separate grain from material-other-than-grain ("MOG"). Harvested grain is typically stored on the combine for subsequent handling, and MOG is typically ejected back onto the crop field.

In some cases, the MOG may be useful as feed for animals or as biofuel, among other things. Thus, once the crop has been harvested and the MOG is left on the field, a windrower may be moved through the field to gather the MOG, shred it into smaller, more uniform pieces, and windrow the shredded material. In the case of corn, for example, the windrower may cut standing stover and accelerate the cut material to an auger that merges and discharges the shredded material into a windrow on the ground that trails the windrower. A baler may, in turn, be moved along each windrow to gather the shredded MOG and form bales of the material for subsequent use.

In other cases, a crop such as switch grass, miscanthus, sugar cane, or other vegetative crop may be grown for use as biofuel. In such cases, the field may be mowed and windrowed, and the cut material (which, for example, may include the whole plant—both grain and MOG) may be baled for subsequent transport and processing.

In either scenario, windrowing and baling the material typically requires a dedicated tractor and operator for each machine. In addition, the cut material that has been placed in windrows on the ground may be susceptible to rain damage and/or contamination from dirt that may be picked up with the material during the baling operation. Moreover, not all of the material may be picked up for baling, which may result in yield loss.

Accordingly, there is a need in the art for a system, apparatus, and method for combining the windrowing and baling operations such that the operations may occur during a single pass. In addition, there is a need for a system, apparatus, and method that maximizes the yield and quality of the cut material that is baled.

BRIEF DESCRIPTION OF THE DRAWINGS

Figure 1A:
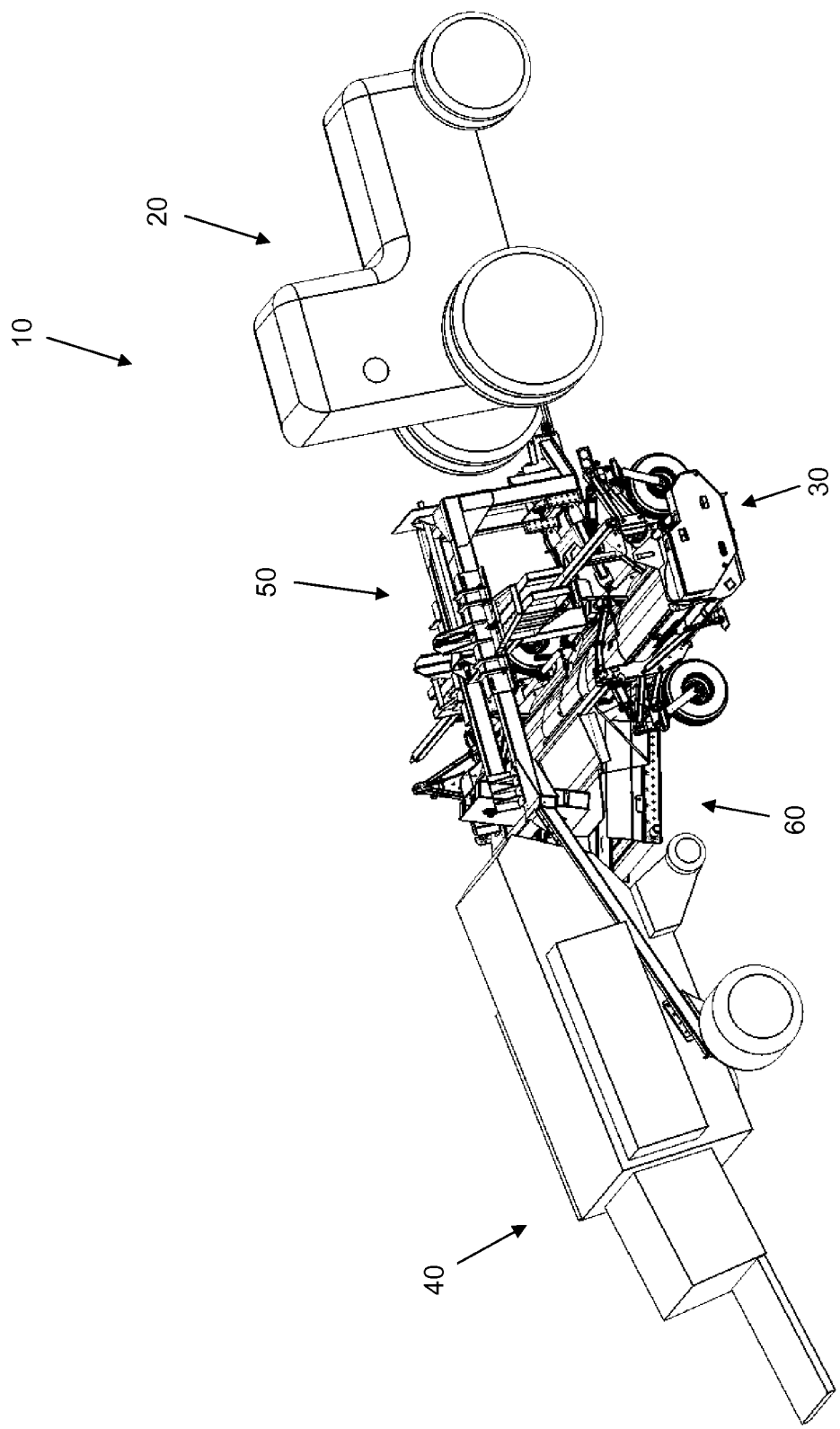
Figure 1B:
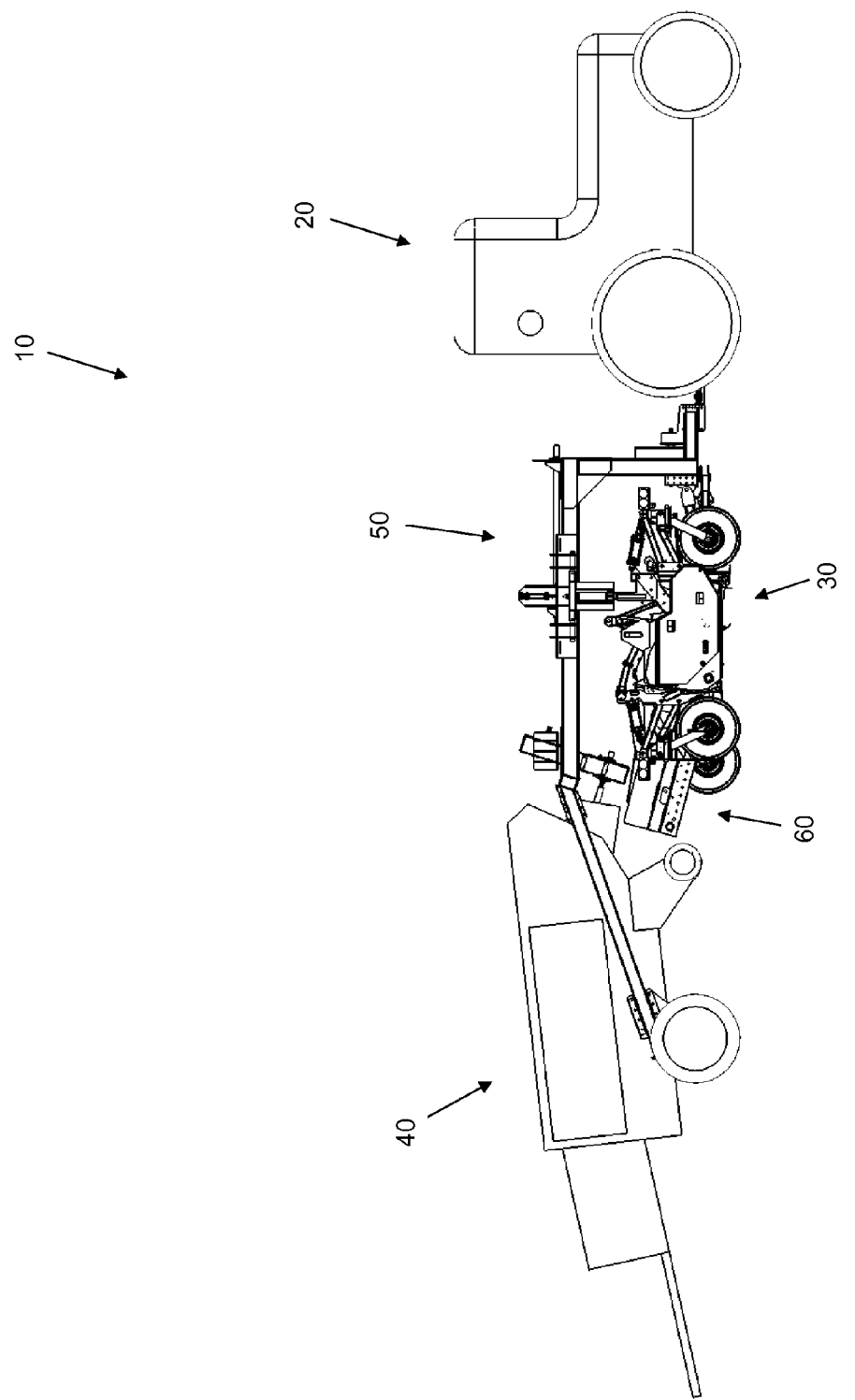
Figure 3:
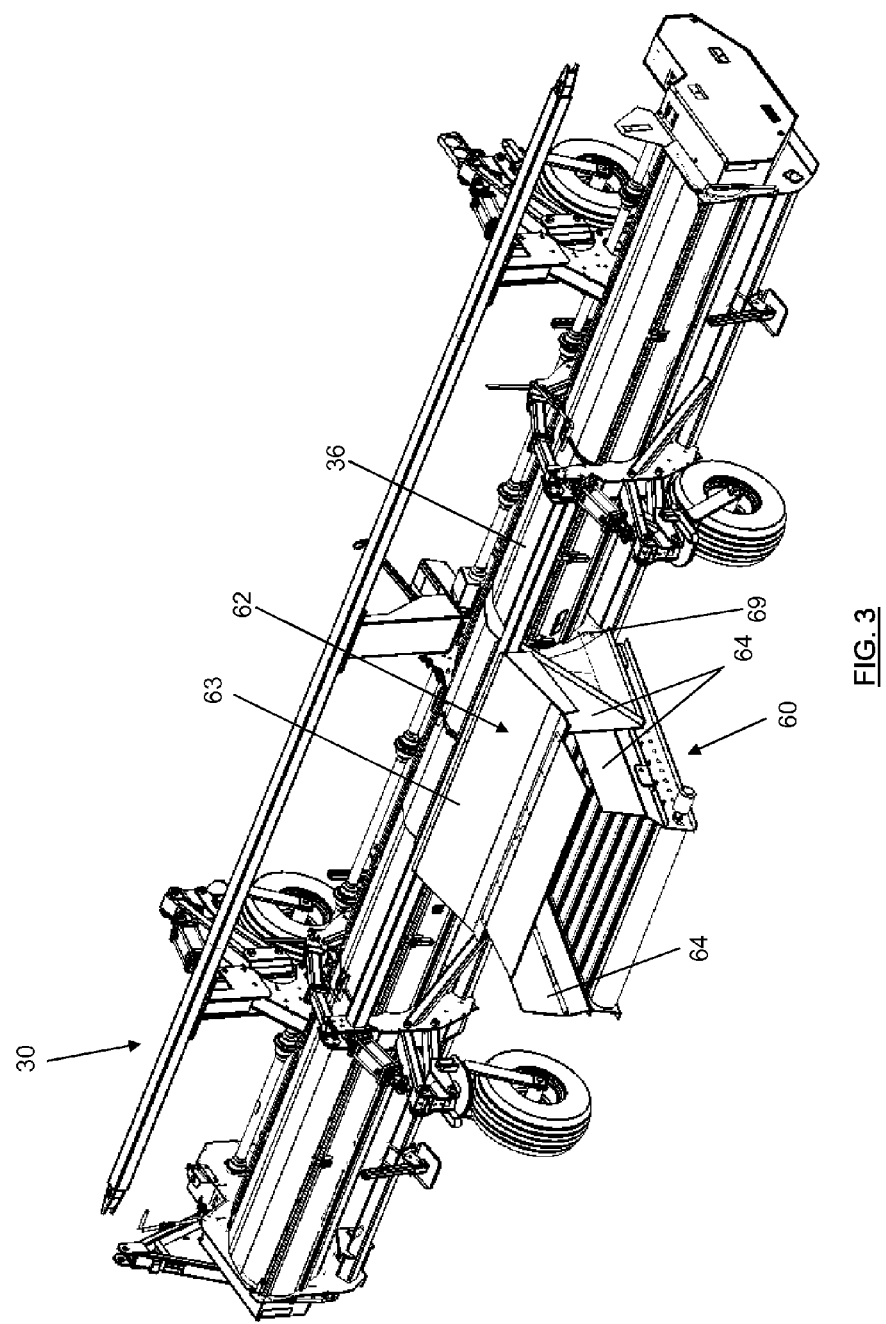
Figure 4:
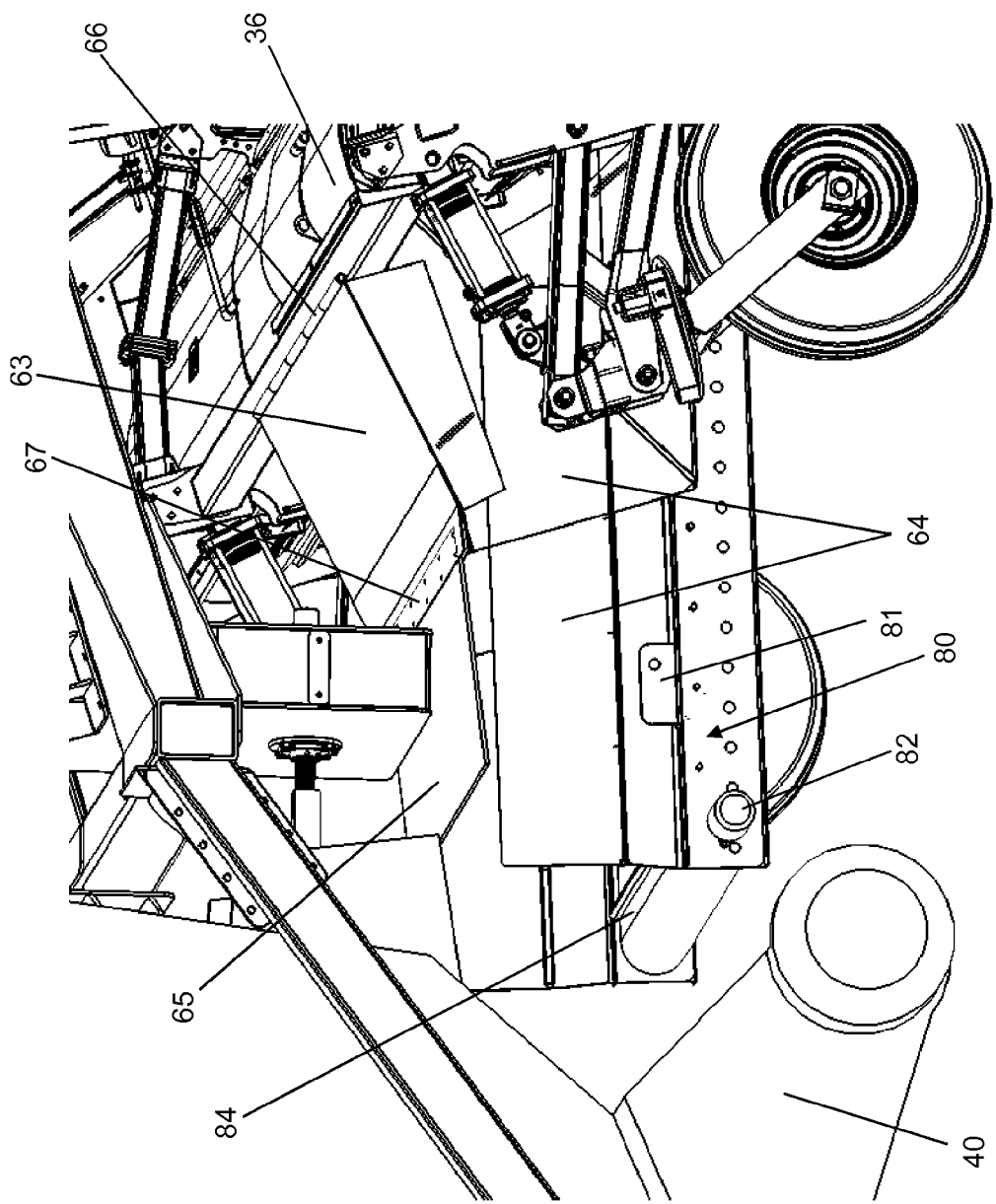
Figure 5:
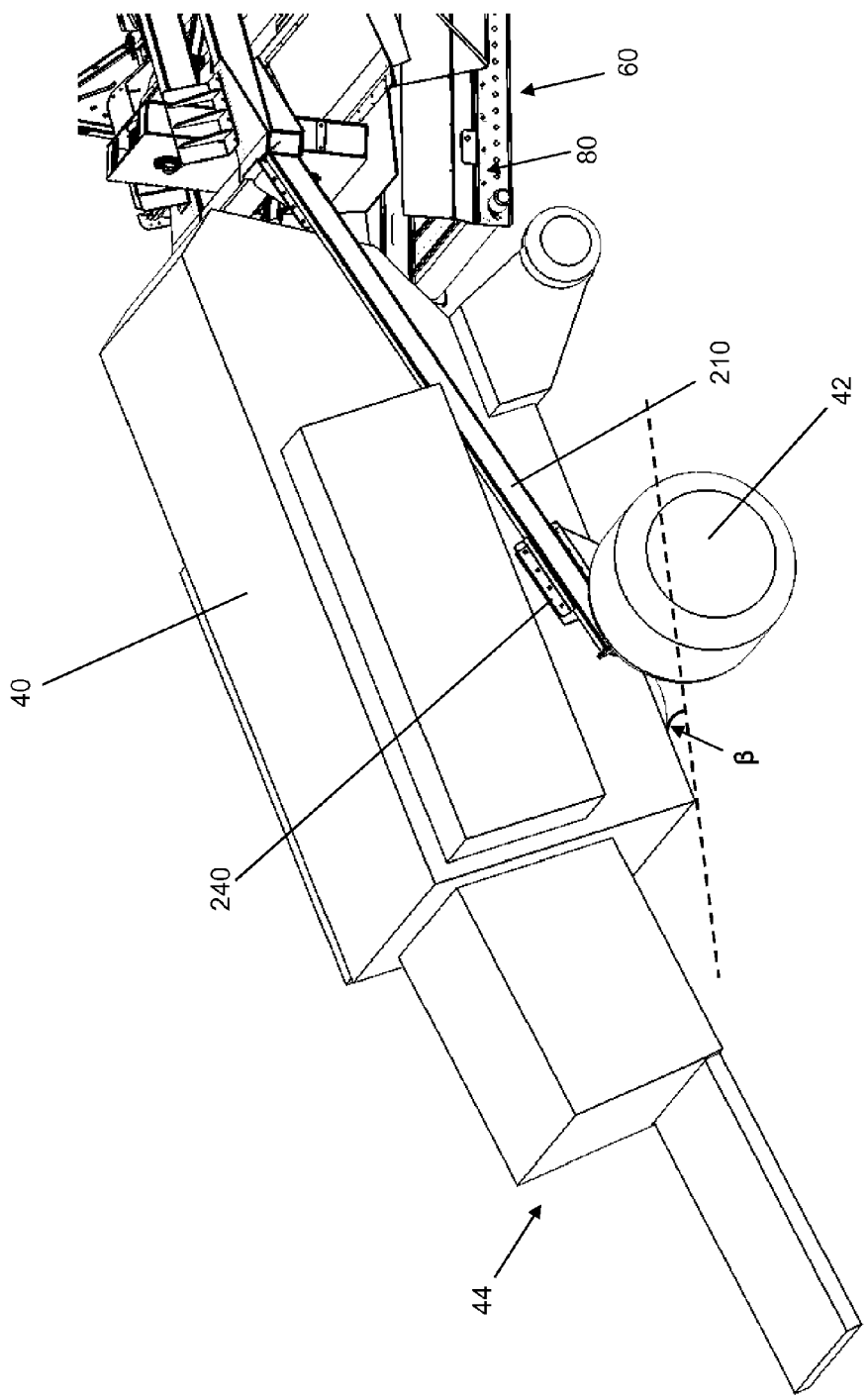
Figure 6:
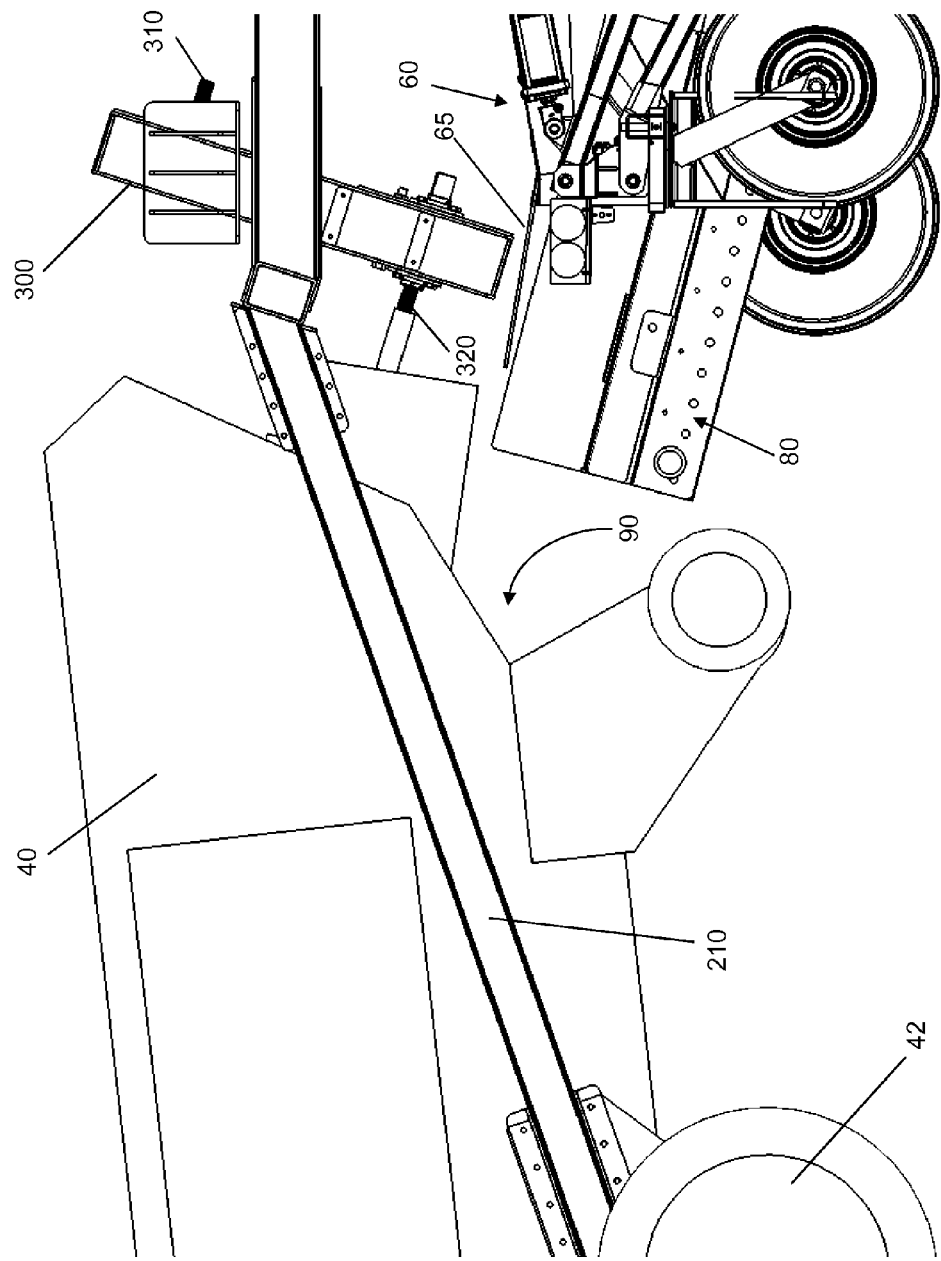
Figure 7:
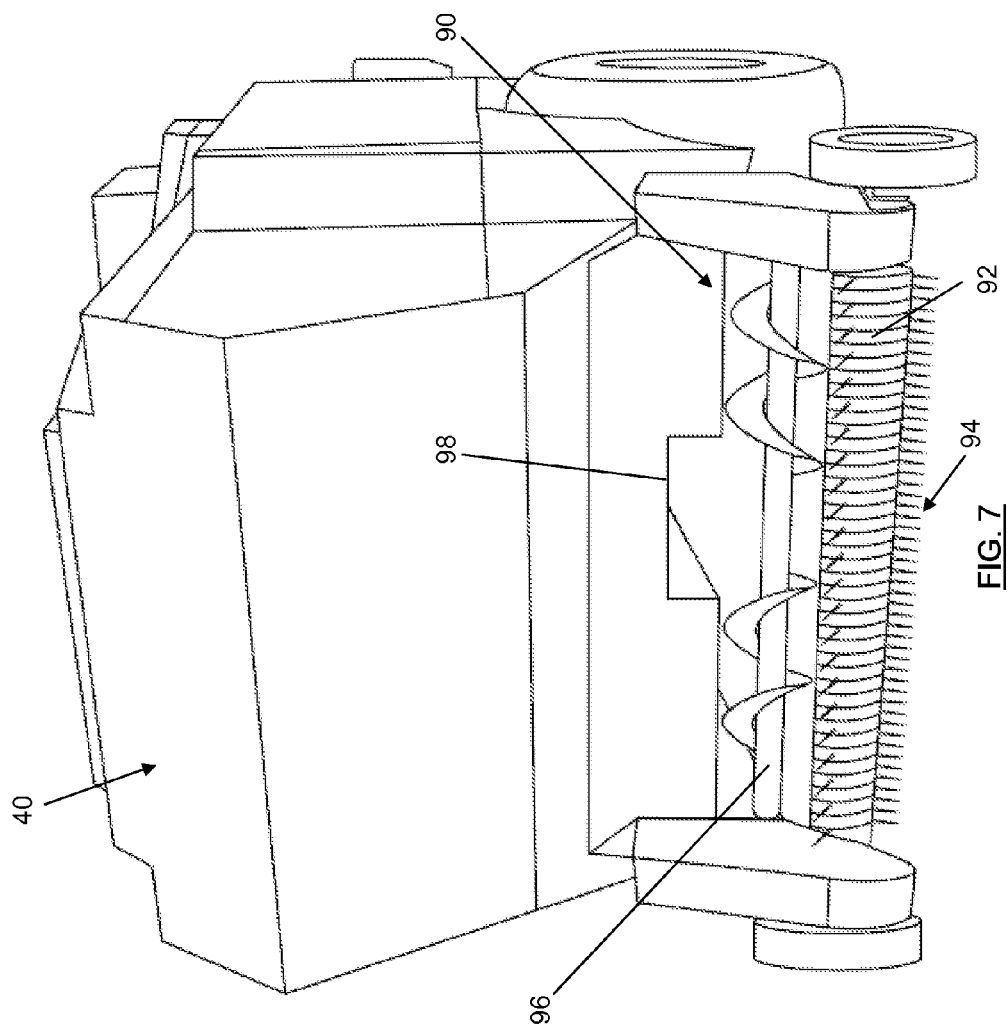
Figure 8:
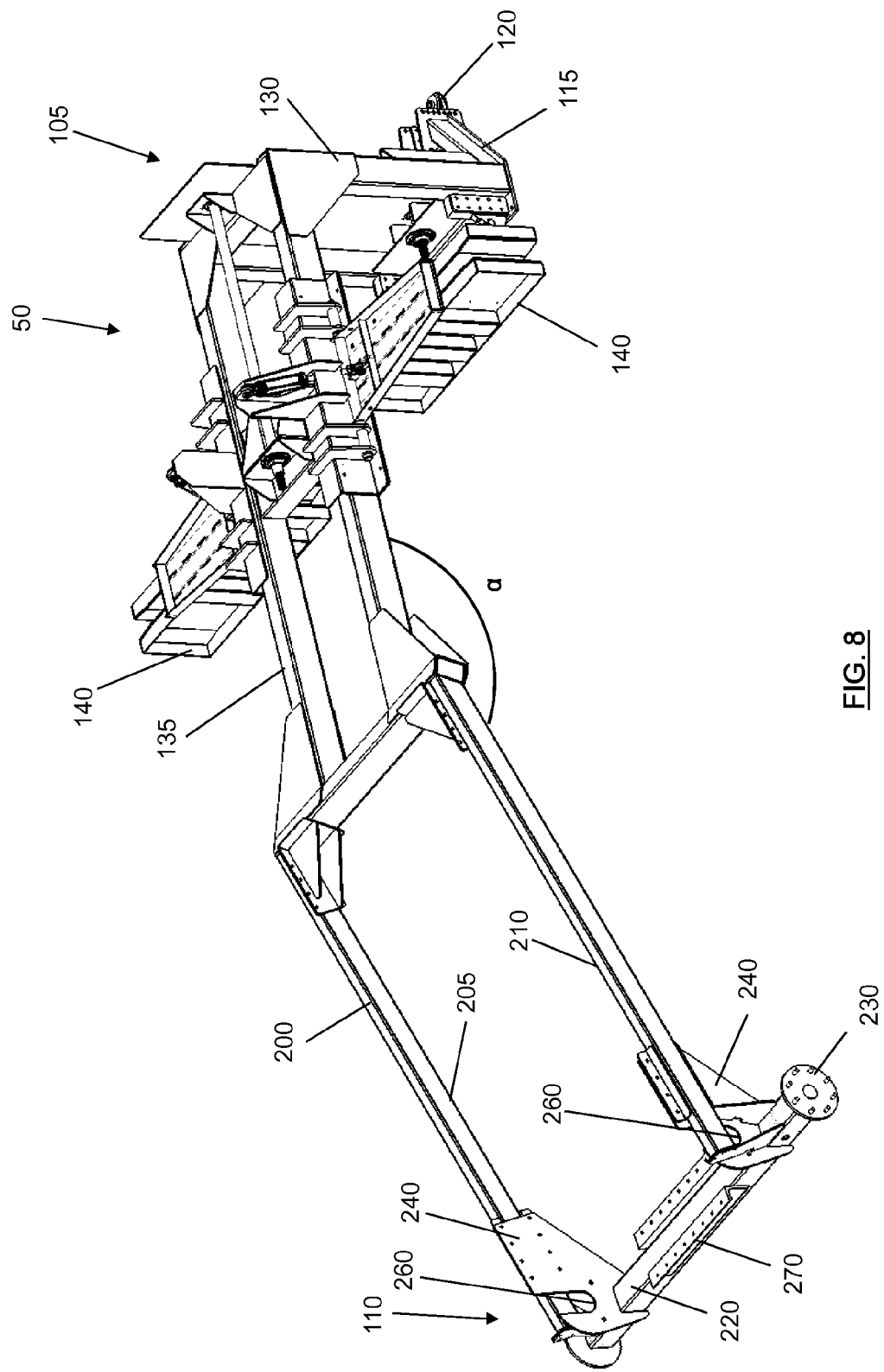
Figure 9:
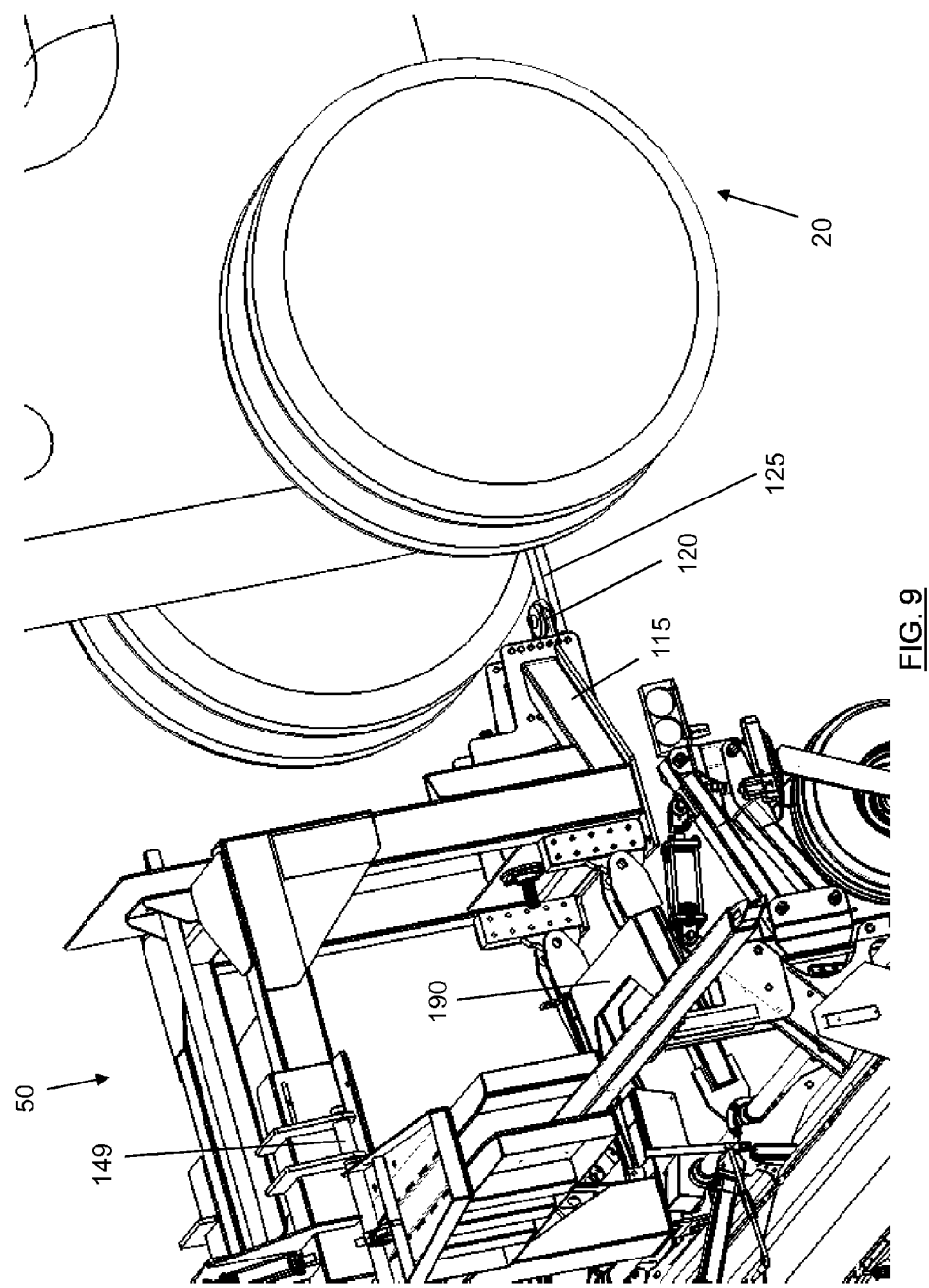
Figure 10:
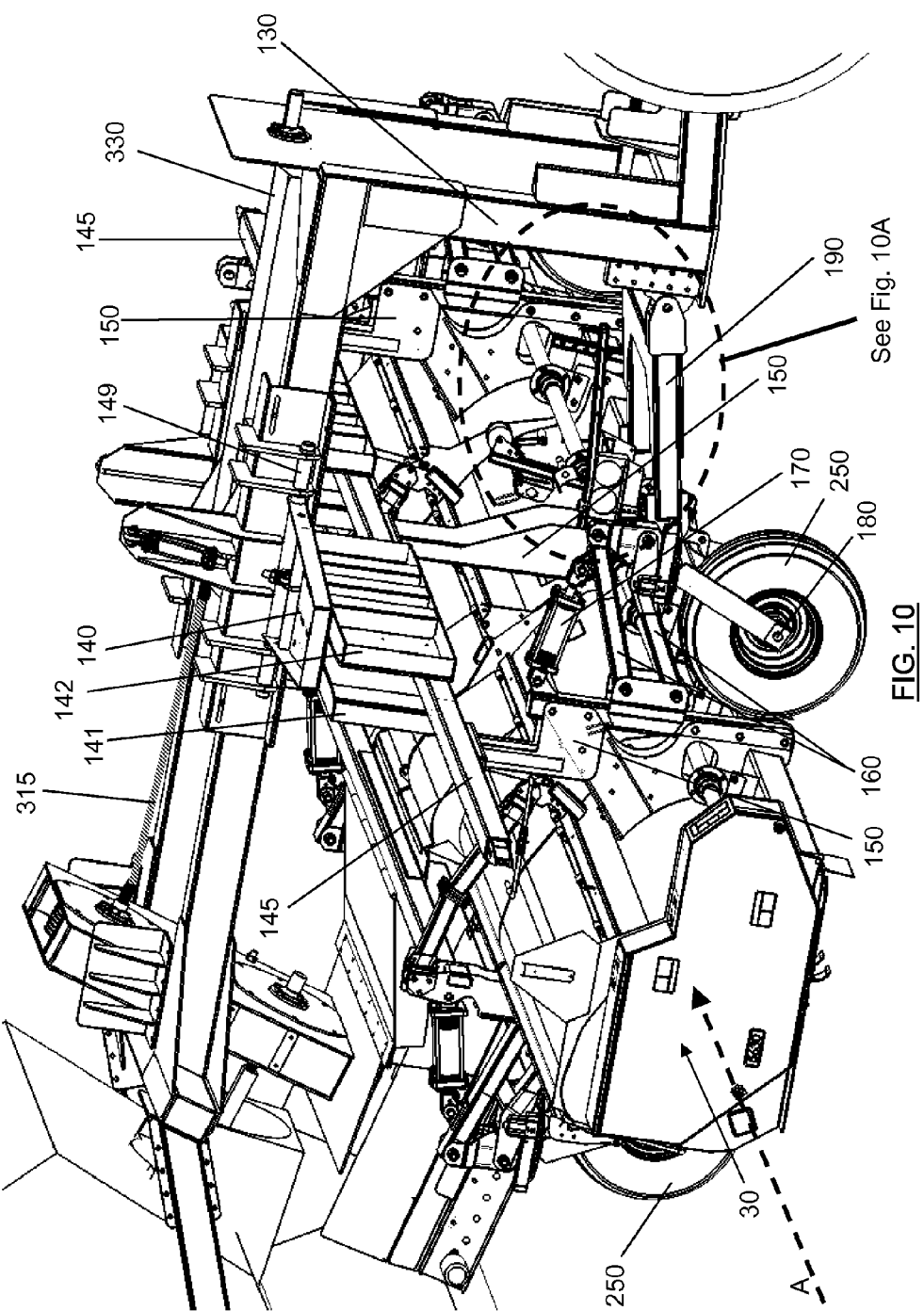
Figure 11:
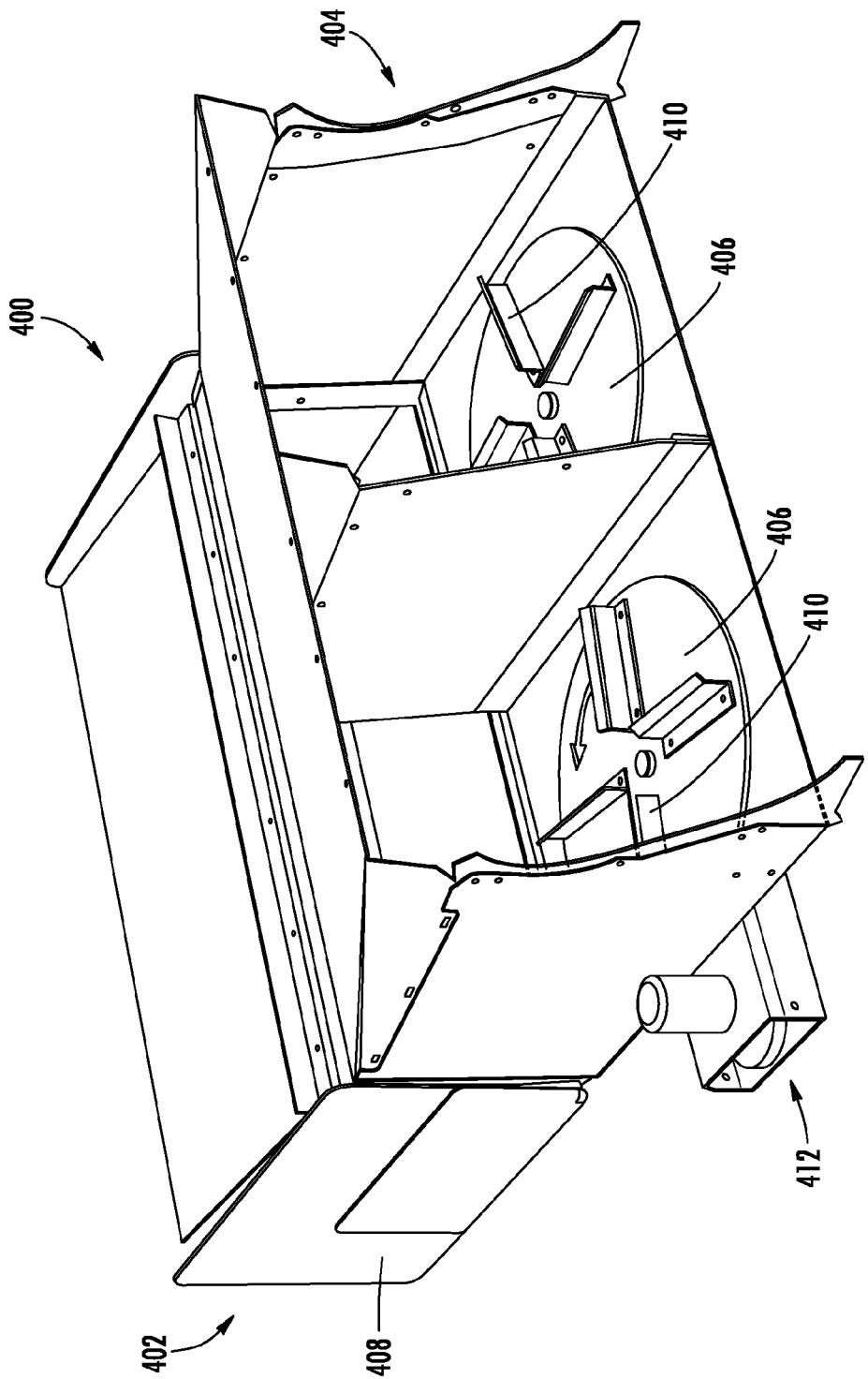

Having thus described the invention in general terms, reference will now be made to the accompanying drawings, which are not necessarily drawn to scale, and wherein:

FIG. 1A shows a perspective view of a tractor, a windrower, a conveying assembly, and a baler that are releasably connected to each other using a connecting assembly in accordance with an exemplary embodiment of the present invention;

FIG. 1B shows a side view of the tractor, windrower, conveying assembly, baler, and connecting assembly of FIG. 1A;

FIG. 2 shows a rear perspective view of the windrower of FIG. 1A with the conveying assembly removed in accordance with an exemplary embodiment of the present invention;

FIG. 2A shows a close-up view of an outlet opening of the windrower of FIG. 2;

FIG. 3 shows a perspective view of the windrower of FIG. 1A with the conveying assembly attached in accordance with an exemplary embodiment of the present invention;

FIG. 4 shows a perspective side view of a conveying assembly in accordance with an exemplary embodiment of the present invention;

FIG. 5 shows a perspective view of the baler of FIG. 1A in accordance with an exemplary embodiment of the present invention;

FIG. 6 shows a perspective view of a baler portion of the connecting assembly of FIG. 1A in accordance with an exemplary embodiment of the present invention;

FIG. 7 shows a front perspective view of the baler of FIG. 5 in accordance with an exemplary embodiment of the present invention;

FIG. 8 shows a perspective view of the connecting assembly of FIG. 1A in accordance with an exemplary embodiment of the present invention;

FIG. 9 shows a perspective view of a first end of the connecting assembly of FIG. 8 in accordance with an exemplary embodiment of the present invention;

FIG. 10 shows a perspective view of a windrower portion of the connecting assembly of FIG. 8 in accordance with an exemplary embodiment of the present invention;

FIG. 10A shows a close-up perspective view of part of the windrower and connecting assembly of FIG. 10 with the tractor removed in accordance with an exemplary embodiment of the present invention;

FIG. 11 shows a perspective view of a propeller-type conveyor; and

Figure 12:
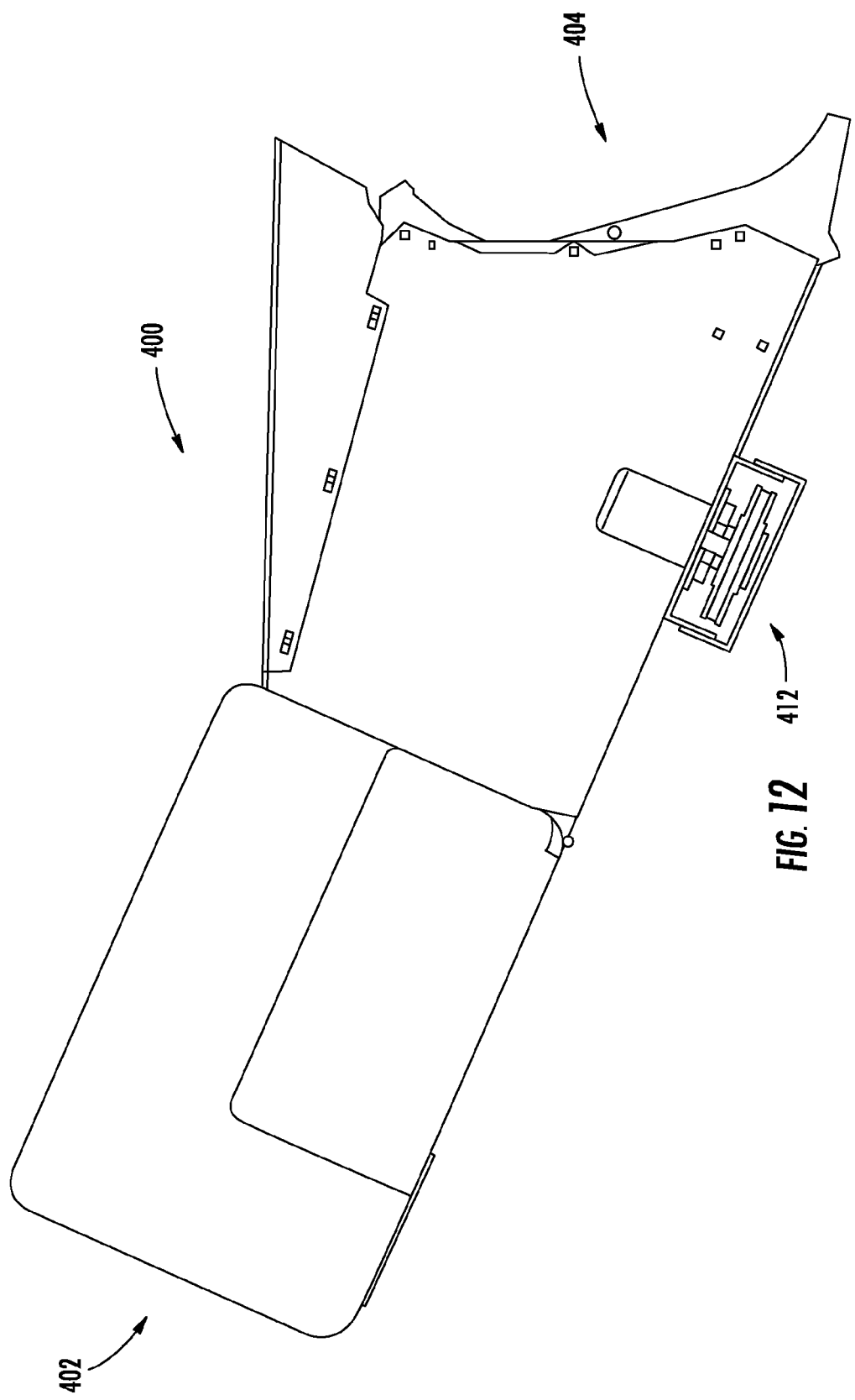

FIG. 12 shows a side view of the propeller-type conveyor of FIG. 11.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the combine harvester are not shown in one or more of the figures for clarity and to facilitate explanation of embodiments of the present invention.

As used herein, the terms "material," "crop," "plants," "crop material," "cut material" and similar terms may be used interchangeably to refer generally to the plants that are cut, windrowed, baled, and/or otherwise processed through machines that are moved through the field, including grain and/or MOG. Thus, use of any such terms should not be taken to limit the spirit and scope of embodiments of the present invention. The crop material may include all or parts of various types of plants such as, for example, corn, soybeans, canola, wheat, oat, rye, alfalfa, barley, rice, sunflowers, switch grass, miscanthus, and sugar cane, among other crops, and/or the MOG associated therewith. For example, in the case of sugarcane, fibrous matter known as bagasse that remains after the sugarcane stalks are crushed to extract their juice may be cut, windrowed, and baled for use as a biofuel and as a renewable resource in the manufacture of pulp and paper products and building materials.

In cases in which a crop (such as corn) is first harvested for its grain, a typical combine may be used that is configured to harvest, thresh, and clean the grain that is gathered from a crop field. For example, a header of the combine may be used to gather the grain from the planted crop, with different headers being specifically designed for specific types of crops. The harvested crop material, which may include both grain and MOG, may then proceed to a threshing area of the combine, where a threshing rotor may thresh the crop material against the inside surface of rotor concaves to separate the grain from the MOG.

The MOG typically is released out of the tail end of the rotor and is disposed onto the crop field, while the grain continues through the combine to be cleaned, tested, and/or stored for subsequent processing. Later, a windrower may be moved through the harvested field (via a tractor) to gather, shred, and/or windrow the MOG, leaving the processed MOG in windrows on the ground in the wake of the windrower's passage. The windrowed MOG may then be baled using a separate baler that is also moved through the field (e.g., pulled by another tractor). The baler may pick up the MOG from the ground, compact, form, and tie the MOG into bales, and deposit the formed bales onto the ground as the baler moves down the field. Thus, in conventional windrowing and baling operations, two passes must be made using two different pieces of equipment (a windrower and a baler) pulled by two tractors.

Similarly, in a case in which a crop (such as switch grass) is grown solely to be cut and baled for subsequent processing, the plant may be cut, shredded, and windrowed onto the field by one piece of machinery, then picked up and baled by another, separate piece of machinery.

In either case, a windrower may be used that is configured to cut and/or gather the material from the field, shred the material into smaller pieces, and discharge the material back onto the field in uniform windrows that are ready for baling by a baler. For example, a piece of equipment such as the Hinicker® 5600. series flail windrower may be used to windrow the material in preparation for baling.

Accordingly, embodiments of the present invention provide for a system, apparatus, and method for windrowing and baling material with a single pass of equipment through a field, thus saving time, labor, and cost. In addition, embodiments of the present invention allow material to be baled directly following the windrowing operation without requiring the material to be deposited onto the ground. In this way, contamination of the material by dirt or moisture may be minimized, and a larger portion of the windrowed material may be baled as the material does not need to picked up off the ground but instead is being deposited directly into the baler.

With reference to FIGS. 1A and 1B, in general, a system 10 is shown that includes a tractor 20, a windrower 30, a baler 40, and a connecting assembly 50 for connecting the tractor, windrower, and baler to each other in series. The system 10 also includes a conveying assembly 60 that provides a mechanism for material that has been processed through the windrower 30 to be conveyed to the baler 40, as described in greater detail below.

The windrower 30 is shown separately from the rest of the system 10 in FIGS. 2 and 2A. The windrower 30, which, in operation, is positioned behind the tractor 20 as illustrated in FIGS. 1A and 1B, is configured to gather the material from the ground using cup knives 32 that extend from a rotor 34 of the windrower. As the rotor 34 rotates, the corresponding motion of the cup knives 32 serves to pick the material up off the ground and shred it within a housing 36 of the windrower 30. Rotating augers 38 within the housing 36 can then move the shredded material towards the center of the windrower 30, where it is discharged from one or more outlet openings 70. A close-up view of the outlet openings 70 is shown in FIG. 2A.

Turning now to FIGS. 3 and 4, the conveying assembly 60 may be attached directly to the outlet opening 70 (FIGS. 2 and 2A) to provide a mechanism for conveying a substantial amount of the shredded material from the windrower 30 to the baler 40 without depositing the material onto the ground. The conveying assembly 60 may be rotatably attached to the windrower housing 36, such as through a pivotable connection 69, which may allow the conveying assembly 60 to be rotated upward (e.g., away from the ground) or downward to adjust the inclination of the conveying assembly with respect to the windrower 30 and the baler 40 and/or to place the conveying assembly in a relatively vertical orientation to facilitate transport of the windrower to and away from the field. The inclination angle of the conveying assembly 60 may be varied, for example, to allow for variations in the height of the windrower 30 with respect to the ground (which may be configured, e.g., based on user preferences and/or the type of crop being processed).

The conveying assembly 60 may include a discharge housing 62, which may comprise a cover panel 63 and side panels 64. A flap extension 65 may also be provided to help maintain the shredded material within the discharge housing 62 and to convey as much of the material as possible to the inlet of the baler 40. The cover panel 63 and side panels 64 may be attached to the housing 36 of the windrower 30 in various ways, such as via fasteners and/or via welding. In some embodiments, for example, the cover panel 63 may be attached to the windrower housing 36 via a hinge 66. In this way, the cover panel 63 may be configured to move up and down relative to the conveying assembly 60 to adjust for different inclinations of the conveying assembly. The flap extension 65 may, likewise, be movably attached to an end of the cover panel 63. For example, the flap extension 65 may be attached to the cover panel 63 via a flexible member 67, or the flap extension itself may be made of a relatively flexible material, such as a plastic or rubber material.

The conveying assembly 60 may further include a conveyor 80 that is at least partially enclosed by the discharge housing 62. In some embodiments, the conveyor 80 may include two or more axles 82 and a belt 84 that is driven via rotation of the axles. At least some of the side panels 64 may be attached to the conveyor 80 via hinges 81, which may allow the side panels 64 to pivot inward (e.g., toward the belt 84), such as to facilitate movement of the conveying assembly 60 to the vertical transport position.

In some cases, in addition or as an alternative to having a belt 84 for conveying the windrowed material to the baler 40, the conveying assembly 60 may comprise a fan blade accelerator (not shown) that is used in connection with a funnel housing (not shown) to blow the material from the outlet opening 70 of the windrower 30 to the inlet of the baler.

Referring to FIGS. 5 and 6, material that is discharged from the outlet opening 70 (FIG. 2A) may be directed onto the conveyor 80 and may be moved towards the baler 40 (see, e.g., FIGS. 5 and 6) via the movement of the conveyor. In some cases, the conveyor 80 may be located at a distance, such as, for example, 6-12. inches, from an inlet 90 of the baler 40, and the material conveyed by the conveyor may need to be conveyed across a gap to reach the baler, as best shown in FIG. 6. Accordingly, the belt 84 (shown in FIG. 4) may be moving at a speed sufficient to propel the material from the belt, across the gap, and into the inlet 90 of the baler 40. The gap may, in some cases, serve to prevent dirt and contaminants from being conveyed from the windrower 30 to the baler 40, as such particles may be heavier than the material that is to be baled and may "fall through" the gap to land on the ground, rather than being propelled with the windrowed material into the baler. In addition, the conveying assembly 60 may be positioned such that the end of the conveyor 80 is disposed higher (e.g., farther from the ground) than the inlet 90 of the baler 40 to facilitate the conveyance of the material into the baler. In some cases, a plate (not shown) may be used to bridge the gap between the end of the conveyor 80 and the inlet 90 of the baler 40.

With reference to FIG. 7, the material may thus be conveyed via the conveying assembly 60 to the inlet 90 of the baler 40. The inlet 90 may include a pick-up rotor 92 from which pick-up teeth 94 may extend for urging material from the conveyor 80 into the baler 40. In some cases, the pick-up teeth 94 may not be used or may not be provided at all, such as when the conveyor 80 is positioned at a distance from the inlet 90 and/or the windrowed material is propelled toward the inlet, as described above. Furthermore, a second belt (not shown) may be provided instead of the pick-up rotor 92 for directing the conveyed material from the conveyor 80 to the inlet 90. An inlet auger 96 may also be provided that is configured to funnel the material towards a central channel 98 of the baler. Movement of the pick-up rotor 92 and the inlet auger 96 may further accelerate the material towards the rear of the channel 98 and may thus facilitate the accumulation, compression, and formation of the bales of material inside the baler 40. Each completed bale may then be pushed out of a discharge opening 44 of the baler 40 (FIG. 5) and left on the field for subsequent pick up and handling.

Referring again to FIGS. 1A and 1B, the windrower 30 with attached conveying assembly 60 may be connected to the baler 40 and to the tractor 20 by virtue of a connecting assembly 50, shown in FIG. 8. The connecting assembly 50 may comprise a frame made of metal, such as steel, that extends between a first end 105 and a second end 110. The first end 105 may be configured for releasable attachment to the tractor 20 (FIGS. 1A and 1B) and may thus include a tongue 115 and a coupler 120. The coupler 120 may be any type of coupler that is designed to connect to a corresponding tow hitch 125 of the tractor 20, such as shown in the close-up view of FIG. 9. For example, the coupler 120 may be configured to connect to a ball hitch 125 in some embodiments.

The connecting assembly 50 may further include a vertical portion 130 proximate the first end 105 that is fixedly attached to the tongue 115, and a windrower portion 135 of the frame may extend substantially perpendicularly from the vertical portion and toward the baler. The windrower portion 135 may have a length that is approximately the same as the length (e.g., in a direction from the tractor towards the baler) of the windrower 30 and the conveying assembly 60. In this way, when the connecting assembly 50 is installed as shown in FIGS. 1A and 1B, for example, the windrower portion 135 may extend over the windrower 30 towards the baler 40.

With reference to FIGS. 8 and 10, the windrower portion 135 of the connecting assembly 50 may be configured to allow for the releasable attachment of the windrower to the connecting assembly. In this regard, the windrower portion 135 of the connecting assembly 50 may include wing portions 140 extending substantially perpendicularly from the windrower portion 135 that are configured to align the windrower with the connecting assembly 50 for making the appropriate connection, as described below. The wing portions 140 may thus include first and second parallel guides 141, 142 that are separated by a clearance that is configured to receive a rail guide portion 145 of the windrower 30. The rail guide portion 145 may, in turn, be fixed to the windrower 30 via vertical bracket supports 150. In the depicted embodiment of FIG. 10, for example, three bracket supports 150 are provided for securing the rail guide portion 145 to the windrower 30.

Moreover, an adjustable hitch 190 may be pivotally attached to the windrower 30 at a first end 192 and may provide for a releasable connection at a second end 194 to a latch 196 of the vertical portion 130 of the connecting assembly 50. In some cases, a mechanism may be provided for raising and lowering the second end 194 of the adjustable hitch 190 so as to engage with or disengage from the latch 196. For example, in the embodiment depicted in FIGS. 10 and 10A, a cable and pulley system 198 is provided to raise and lower the second end 194 of the adjustable hitch 190. The structures and components depicted in the figures (e.g., FIGS. 10 and 10A) have been simplified for clarity and ease of explanation. As such, some of the fasteners, hinge pins, connectors, cables, etc., although described above, may not be shown in the figures.

The windrower 30, with the rail guide portion 145 attached to the housing 36, may be transported separately from the connecting assembly 50, tractor 20, and baler 40 to the desired location (e.g., the field to be windrowed) in a lengthwise orientation (i.e., with the width, or long dimension, of the windrower aligned with the direction of travel) by virtue of the fully rotatable caster wheels 250 of the windrower. Once at the location, the windrower may be connected to the connecting assembly 50 by moving the windrower 30 perpendicularly with respect to the orientation of the connecting assembly 50 (in the direction A shown in FIG. 10), such that the rail guide portion 145 fits in between the first and second parallel guides 141, 142 of the wing portions 140 of the connecting assembly. When the rail guide portion 145 is received between the first and second parallel guides 141, 142, and the windrower 30 is centered with respect to the axis of the windrower portion 135, the windrower 30 may be in position to connect to the latch 196 via the second end 194 of the adjustable hitch 190 (for example, by activating the cable and pulley system 198 to lower the second end 194 of the adjustable hitch 190 into engagement with the latch 196).

The wing portions 140 may be pivotally connected to the connecting assembly 50 (e.g., via a hinge connection 149), such that once the windrower 30 is in position, with the rail guide portion 145 received between the first and second parallel guides 141, 142 and the adjustable hitch 190 engaged with the latch 196, the wing portions 140 may be raised up and away from the rail guide portion. In addition, the hinge connection 149 may allow the free ends of the wing portions 140 to be raised to a vertical position, away from the ground (perpendicular to the position shown in FIG. 10, for example) to minimize the width of the connecting assembly 50 to facilitate transport to and from the field.

In some embodiments, the adjustable hitch 190 may be pivotally attached to one or both of the windrower 30 and the vertical portion 130 at the first and second ends 192, 194, respectively, to allow for relative movement between the windrower and the tractor 20 that may occur as the tractor pulls the windrower and baler across uneven ground, for example. In addition, further bracket supports and attachments may be provided, for example, to maintain the windrower 30 in a particular orientation with respect to the connecting assembly 50 and/or to provide for adequate suspension and stability of the windrower 30 with respect to the tractor 20 and the baler 40 as the system 10 is moved through the field. For example, in FIG. 10, suspension brackets 160 and dampers 170 are provided for attaching the connecting assembly 50 to the axle 180 of the leading wheels 250 of the windrower 30.

Referring back to FIG. 8, the frame of the connecting assembly 50 may further include a baler portion 200 that is configured to at least partially surround the baler 40 and connect to the rear wheels 42 of the baler proximate the second end 110 of the connecting assembly. The baler portion 200 may, for example, extend from the windrower portion 135 at an angle, such as to form an angle α of between 170° to 150° with the windrower portion. In this regard, the baler portion 200 may include two arms 205, 210 that flank the two sides of the baler 40 and extend toward the rear wheels 42 of the baler (see, e.g., FIG. 5).

A transverse support member 220 may be provided proximate the second end 110 of the connecting assembly 50 that is configured to hold a secondary axle (not shown), and a circular hub 230 may be attached at each end of the secondary axle for connecting to the rear wheels 42 of the baler 40. The circular hubs 230 may, for example, be attached to the secondary axle via bearings that would allow the wheels to move independently of the secondary axle. The original axle of the baler 40 (not shown) may thus rest in notches 260 that are defined at the second end 110 of the connecting assembly 50. The original axle may be secured to the transport support member 220 via U-bolts (not shown) or other fasteners that may be fastened to angle irons 270 attached to the transport support member 220. In this way, the baler portion 200 of the connecting assembly 50 may serve as an additional structural support for the baler 40. In other embodiments, however, a secondary axle may not be provided, and the second end 110 of the connecting assembly 50 may attach to the baler 40 via the original axle of the baler or using a different attachment method.

Support brackets 240 may also be provided for fixing the arms 205, 210 of the baler portion 200 to the sides of the baler 40 (FIG. 5) to provide additional stability. In this regard, the support brackets 240 may be attached to the sides of the baler 40, such as via fasteners or welds, in a way that maintains the baler 40 at an angle with respect to the ground, as shown in FIG. 5, for example. In some embodiments, for example, the baler 40 is attached to the connecting assembly 50 such that the base 41 of the baler is at an angle β of between 5° and 15° with respect to the ground. In this way, once the different components are attached via the connecting assembly 50, the conveying assembly 60 may be located at a higher position with respect to the ground than the inlet 90 of the baler 40. Accordingly, material that is moved via the conveying assembly 60 towards the inlet 90 of the baler 40 may be dropped into the inlet 90 with the help of gravity, making the transfer of the material into the baler more efficient, as described above.

In addition to maintaining the tractor 20, windrower 30, conveying assembly 60, and baler 40 in the correct position and orientation with respect to each other, the connecting assembly 50 may further be configured to transmit power between the tractor, the windrower, and/or the baler. For example, in some embodiments, a belt drive 300 (shown in FIG. 6) may be attached to the connecting assembly 50 and may house a gear and belt system (not shown) that is configured to transmit power from a first shaft 310 to a second shaft 320. The second shaft 320 may, through the use of additional gears and belts, not shown, drive the various components of the baler 40, including, for example, the pick-up rotor 92 and the inlet auger 96 shown in FIG. 7. Turning to FIG. 10, the first shaft 310 may be connected via a coupling 315 to a main shaft 330, and the main shaft may in turn be driven by a power take-off (not shown) from the tractor 20 via additional gears and belts (not shown) positioned along the vertical portion 130 of the connecting assembly 50. The power take-off may also supply power to the windrower 30 via additional shafts, gears, belts, and couplings (also not shown for purposes of clarity). In this way, in some embodiments, power may be transferred from the tractor 20 to both the windrower 30 and the baler 40 via the connecting assembly 50.

As an alternative to the belt conveyor 80 described above, a propeller-type conveyor may be used. FIGS. 11 and 12 depict an example of a propeller-type conveyor 400. As shown in the figures, the propeller-type conveyor 400 includes a baler end 402 configured to be positioned proximate the baler 40, and a shredder end 404 configured to be positioned proximate the windrower 30. A pair of spinners 406 are located proximate the shredder end 404 and are configured to propel material from the windrower 30 into the baler 40. A chute 408 is located proximate the baler end 402.

In various embodiments, the propeller-type conveyor 400 may be hydraulically driven with in-line flow controls to facilitate spinner speed adjustments. In the depicted embodiment, the spinners 406 are heavy duty turntable-type spinners with vanes 410 attached to a spinner plate. In various embodiments, the spinners 406 may be driven in a variety of ways. In the depicted embodiment, the spinners 406 are driven by a v-belt pulley system 412. In various embodiments, the chute 408 may be adjustable and/or foldable so that it can be adjusted to mate-up with the baler 40. In some embodiments, the chute 408 may fold up into a vertical position for transport.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for windrowing and baling material in a single pass, the system comprising:
   a tractor;
   a windrower configured to windrow material and comprising an outlet opening;
   a baler configured to bale material that has passed through the windrower and comprising an inlet;
   a conveying assembly attached to the outlet opening of the windrower, the conveying assembly comprising a propeller-type conveyer, the propeller-type conveyor comprising one or more spinners, wherein the one or more spinners are turntable-type spinners that comprise one or more vanes attached to a spinner plate, wherein the conveying assembly is configured to move the material from the outlet opening of the windrower toward the inlet of the baler, and wherein the one or more spinners are configured to propel material from the windrower into the baler; and
   a connecting assembly configured to connect to the tractor, the windrower, and the baler, wherein the windrower comprises opposite wing portions extending substantially perpendicularly from the windrower, the wing portions comprising first and second parallel guides that are configured to align the connecting assembly with the windrower.

2. The system of claim 1, wherein the conveying assembly is rotatably attached to the windrower by a pivotable connection, and wherein the conveying assembly is configured to be rotated upward or downward relative to the pivotable connection to adjust an inclination angle of the conveying assembly.

3. The system of claim 2, wherein the conveying assembly is configured to be rotated relative to the pivotable connection to a relatively vertical orientation to facilitate transport.

4. The system of claim 1, wherein the propeller-type conveyor comprises an adjustable chute located proximate a baler end.

5. The system of claim 1, wherein the connecting assembly comprises a vertical portion proximate a first end of the connecting assembly and a windrower portion that extends substantially perpendicularly from the vertical portion, the vertical portion being fixedly attached to a tongue of the connecting assembly.

6. The system of claim 5, wherein the windrower portion has a length that is approximately the same as a total length of the windrower and the conveying assembly.

7. The system of claim 1, wherein the connecting assembly comprises a frame configured to be releasably attached to the windrower.

8. The system of claim 1, wherein the wing portions comprise first and second parallel guides separated by a clearance configured to receive a rail guide portion of the windrower.

9. The system of claim 8, wherein the wing portions are pivotally connected to the connecting assembly by a hinge connection such that the wing portions may be raised upward and away from the rail guide portion.

10. The system of claim 9, wherein the hinge connection permits the wing portions to be raised to a vertical position to minimize a width of the connecting assembly to facilitate transport.

11. The system of claim 1, wherein an adjustable hitch is pivotally attached to the windrower at a first end and is configured to provide a releasable connection at a second end to a latch of the connecting assembly.

12. The system of claim 11, further comprising means for raising and lowering the second end of the adjustable hitch so as to engage with or disengage from the latch.

13. The system of claim 11, wherein the adjustable hitch is pivotally attached to one or both the windrower and the connecting assembly.

14. The system of claim 1, wherein the connecting assembly comprises a baler portion configured to at least partially surround the baler and connect to rear wheels of the baler proximate an end of the connecting assembly.

15. The system of claim 1, wherein the connecting assembly further comprises an axle and a circular hub attached to the axle for connecting to rear wheels of the baler.

16. The system of claim 1, wherein support brackets are attached to sides of the baler so as to maintain the baler at an angle with respect to ground, and wherein the angle is between 5° and 15°.

17. The system of claim 1, wherein the connecting assembly is further configured to transmit power between the tractor and at least one of the windrower and the baler.

18. A system for windrowing and baling material in a single pass, the system comprising:
a tractor;
a windrower configured to windrow material and comprising an outlet opening;
a baler configured to bale material that has passed through the windrower and comprising an inlet;
a conveying assembly attached to the outlet opening of the windrower, the conveying assembly comprising a propeller-type conveyer, the propeller-type conveyor comprising one or more spinners, wherein the one or more spinners are turntable-type spinners that comprise one or more vanes attached to a spinner plate, wherein the conveying assembly is configured to move the material from the outlet opening of the windrower toward the inlet of the baler, and wherein the one or more spinners are configured to propel material from the windrower into the baler; and
a connecting assembly configured to connect to the tractor, the windrower, and the baler.

19. The system of claim 18, wherein the conveying assembly is rotatably attached to the windrower by a pivotable connection, and wherein the conveying assembly is configured to be rotated upward or downward relative to the pivotable connection to adjust an inclination angle of the conveying assembly.

20. The system of claim 19, wherein the conveying assembly is configured to be rotated relative to the pivotable connection to a relatively vertical orientation to facilitate transport.

21. The system of claim 18, wherein the propeller-type conveyor comprises an adjustable chute located proximate a baler end.

22. The system of claim 18, wherein an adjustable hitch is pivotally attached to the windrower at a first end and is configured to provide a releasable connection at a second end to a latch of the connecting assembly.

23. The system of claim 22, further comprising means for raising and lowering the second end of the adjustable hitch so as to engage with or disengage from the latch.

24. The system of claim 22, wherein the adjustable hitch is pivotally attached to one or both the windrower and the connecting assembly.

25. The system of claim 18, wherein the connecting assembly comprises a baler portion configured to at least partially surround the baler and connect to rear wheels of the baler proximate an end of the connecting assembly.

26. The system of claim 18, wherein the connecting assembly further comprises an axle and a circular hub attached to the axle for connecting to rear wheels of the baler.

27. The system of claim 18, wherein support brackets are attached to sides of the baler so as to maintain the baler at an angle with respect to ground, and wherein the angle is between 5° and 15°.

28. The system of claim 18, wherein the connecting assembly is further configured to transmit power between the tractor and at least one of the windrower and the baler.

29. A system for windrowing and baling material in a single pass, the system comprising:
a tractor;
a windrower configured to windrow material and comprising an outlet opening;
a baler configured to bale material that has passed through the windrower and comprising an inlet;
a conveying assembly attached to the outlet opening of the windrower, wherein the conveying assembly is configured to move the material from the outlet opening of the windrower toward the inlet of the baler; and
a connecting assembly configured to connect to the tractor, the windrower, and the baler, wherein the windrower comprises opposite wing portions extending substantially perpendicularly from the windrower, wherein the wing portions comprise first and second parallel guides separated by a clearance configured to receive a rail guide portion of the windrower, the first and second parallel guides being configured to align the connecting assembly with the windrower, and wherein the wing potions are pivotally connected to the connecting assembly by a hinge connection such that the wing portions may be raised upward and away from the rail guide portion.

30. The system of claim 29, wherein the conveying assembly is rotatably attached to the windrower by a pivotable connection, and wherein the conveying assembly is configured to be rotated upward or downward relative to the pivotable connection to adjust an inclination angle of the conveying assembly.

31. The system of claim 30, wherein the conveying assembly is configured to be rotated relative to the pivotable connection to a relatively vertical orientation to facilitate transport.

32. The system of claim 29, wherein the hinge connection permits the wing portions to be raised to a vertical position to minimize a width of the connecting assembly to facilitate transport.

33. The system of claim 29, wherein an adjustable hitch is pivotally attached to the windrower at a first end and is configured to provide a releasable connection at a second end to a latch of the connecting assembly.

34. The system of claim 33, further comprising means for raising and lowering the second end of the adjustable hitch so as to engage with or disengage from the latch.

35. The system of claim 33, wherein the adjustable hitch is pivotally attached to one or both of the windrower and the connecting assembly.

36. The system of claim 29, wherein the connecting assembly comprises a baler portion configured to at least partially surround the baler and connect to rear wheels of the baler proximate an end of the connecting assembly.

37. The system of claim 29, wherein support brackets are attached to sides of the baler so as to maintain the baler at an angle with respect to ground, and wherein the angle is between 5° and 15°.

38. The system of claim 29, wherein the connecting assembly is further configured to transmit power between the tractor and at least one of the windrower and the baler.

* * * * *